United States Patent [19]

Naber et al.

[11] 3,719,866

[45] March 6, 1973

[54] SEMICONDUCTOR MEMORY DEVICE

[75] Inventors: Charles T. Naber, Centerville, George C. Lockwood, Kettering, both of Ohio

[73] Assignee: The National Cash Register Company, Dayton, Ohio

[22] Filed: Dec. 3, 1970

[21] Appl. No.: 94,861

[52] U.S. Cl........317/235 R, 317/235 B, 317/235 AZ
[51] Int. Cl................................................H01l 11/14
[58] Field of Search.............317/235, 235 B, 235 AZ

[56] References Cited

UNITED STATES PATENTS

| | | | |
|---|---|---|---|
| 3,339,128 | 8/9167 | Olmstead | 317/235 |
| 3,455,020 | 7/1969 | Dawyon | 29/571 |

FOREIGN PATENTS OR APPLICATIONS

| | | | |
|---|---|---|---|
| 813,537 | 5/1969 | Canada | 317/235 AZ |

OTHER PUBLICATIONS

Barney, W., Electronics, Mar. 31, 1969, pages 117–120.

*Primary Examiner*—Martin H. Edlow
*Attorney*—Louis A. Kline, John J. Callahan and Harry W. Barron

[57] ABSTRACT

An improved metal-nitride-oxide-semiconductor device is described which has a dual thickness oxide layer. The oxide layer has a thick portion in the vicinity of the drain region and a thin portion elsewhere. The improved device solves the problem of low voltage breakdown of the drain-substrate diode and limits the threshold voltage variations within the same polarity range.

17 Claims, 4 Drawing Figures

INVENTORS
CHARLES T. NABER &
GEORGE C. LOCKWOOD

BY Louis A Kline
John J. Callahan
Harry W Barron
THEIR ATTORNEYS

INVENTORS
CHARLES T. NABER &
GEORGE C. LOCKWOOD

BY Louis A. Kline
John J. Callahan
Harry W. Barron
THEIR ATTORNEYS

SEMICONDUCTOR MEMORY DEVICE

This invention relates to a semiconductor memory device and more particularly to an improved metal-nitride-oxide-semiconductor (MNOS) device which can be used, for instance, as a memory element in an electronically alterable read-only memory.

Recently, a new type of semiconductor device has been developed which exhibits the characteristic of being able to store charge to thereby vary the threshold voltage of the device; that is, the voltage which is required to be applied to the control electrode thereof to render the device conductive. Such a device has great utility for use as a memory element. One may merely change the threshold voltage of the device to either a high value or a low value depending on whether a binary "1" or a binary "0" binary digit (bit) is to be stored. To read the bit thereafter, it is necessary to apply a voltage which is between the high and the low threshold voltages to the control electrode. If the device conducts, a bit of one value is being read, and, if the device does not conduct, a bit of the other value is being read. Memory elements made of MNOS devices are extremely nonvolatile; that is, they will hold the charge for a long time. Therefore, it is not necessary to continually refresh each device or to provide special circuitry in the event a power breakdown occurs.

One problem which must be overcome before state-of-the-art MNOS devices can become practical is to eliminate the problem which causes the drain-substrate junction to suffer zener breakdown at low voltages. This breakdown voltage may be as low as eight to ten volts, but, when the device is to be used, for instance, in an integrated circuit environment, it is desirable, in many instances, to apply a bias voltage between the drain electrode and the substrate which is considerably higher than this low breakdown voltage.

Another problem existing in certain circuit applications of state-of-the-art MNOS devices is that the threshold voltage can vary between a positive voltage and a negative voltage. Thus, when the device has been caused to assume a positive threshold voltage, the device will be on when no voltage is applied to its control electrode, and, in order to turn the device off, it will be necessary to apply a positive voltage to its control electrode. On the other hand, when the threshold voltage has been caused to assume a negative value, it will be necessary to apply a negative voltage to the control electrode in order to turn the device on. This results in a requirement that both a positive and a negative voltage supply must be provided in order to properly utilize the state-of-the-art MNOS device. This, of course, is undesirable both from an economic point of view and from a space utilization point of view where the device is to be constructed on an integrated circuit.

In accordance with this invention, a memory type field effect semiconductor device is provided which comprises a semiconductor substrate that includes a region capable of becoming a channel through which majority carriers can flow. The channel has a first end, into which the majority carriers are introduced, and a second end, from which the majority carriers are derived. The device further includes a first insulator layer, of a material having a relatively low charge trapping capability, and a second insulator layer, of material having a relatively high charge trapping capability. In addition, there is further included a conductive layer which is positioned above the channel and spaced therefrom by the first and second insulator layers. The second insulator layer is spaced from the channel by the first insulator layer, and the first insulator layer is thicker in the vicinity of the second end of the channel than in the vicinity of the first end of the channel.

The invention will be described in more detail hereinafter with reference being made to the following FIGS. in which.

Figure 1:
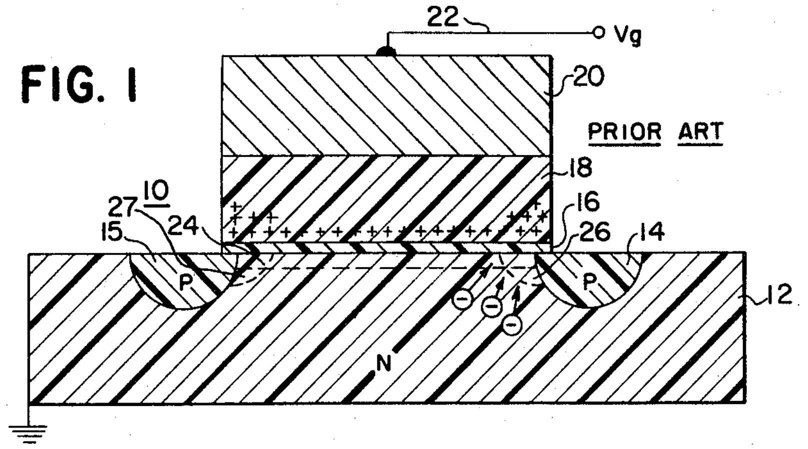
FIG. 1 shows a state-of-the-art MNOS device.

Referring now specifically to FIG. 1, there is shown a device 10 typical of the prior-art MNOS devices. The device 10 includes a substrate 12, which may be silicon. Within the substrate 12 there is diffused, by conventional techniques, a pair of opposite conductivity regions 14 and 15, which will serve respectively as the drain and the source of the device 10. As is generally understood in the art, the source electrode 15 is the one into which majority carriers are introduced, and the drain electrode 14 is the one from which majority carriers are derived. It will be assumed hereinafter that the substrate 12 is doped in N type impurities and that the source 15 and the drain 14 are doped with P type impurities.

Directly above the substrate 12 and overlapping slightly the drain and source regions 14 and 15, there is a layer of a material having a low charge trapping characteristic, such as the silicon oxide layer 16, which may be silicon dioxide ($SiO_2$) material. The silicon oxide layer 16 may be any thickness which allows charge to flow therethrough, such as, for instance, between fifteen and sixty Angstroms, with 30 Angstroms being a typical example. Above the silicon oxide layer 16 there is a layer of a material having a high charge trapping characteristic, such as the silicon nitride ($Si_3N_4$) layer 18, which may have a thickness between, for instance, 400 and 1,000 Angstroms, with 750 Angstroms being a typical example. Above the silicon nitride layer 18 there is a layer of conductive material 20, such as aluminum, which may be from 10,000 to 15,000 Angstroms in thickness, with 12,000 Angstroms being a typical example.

When a voltage which is more negative than the threshold voltage of the device 10 is applied between the line 22, which is coupled to the conductive layer 20, and the substrate 12, which is coupled to ground, an inversion in the conductivity occurs in the substrate 12 in the area near the silicon oxide layer 16. This inversion is shown by the region 24 in FIG. 1, and hereinafter will be referred to as the channel. When the channel 24 is present, majority carriers can flow between the source 15 and the drain 14, and the device is then in its conductive, or "on," state. If a voltage which is more positive than the threshold voltage associated with the device 10 is applied between the line 22 and the substrate 12, then the channel region 24 will not be formed, and no majority carriers can flow between the source 15 and the drain 14. In this case, the device is said to be in its nonconductive, or "off," state. In the P channel device 10, the majority carriers are electrons, so current will flow from the source 15 to the drain 14.

As previously mentioned, the device 10 is capable of exhibiting memory; that is, of storing a charge which results in the threshold voltage of the device 10 changing from the natural threshold voltage associated therewith. This memory characteristic of the device 10 is not completely understood; however, it appears that, when a rather large voltage Vg is applied between the line 22 and the substrate 12 for a rather long time (e.g., plus or minus 30 volts for 1 millisecond), charge will build up at the interface of the silicon oxide layer 16 and the silicon nitride layer 18. This stored charge will result in the channel 24 being formed at a different threshold voltage, since the stored charge will create a field which will be either added or subtracted, depending upon the polarity of the charge, to or from the field created by the voltage subsequently applied to the line 22.

The charge at the interface of the silicon oxide layer 16 and the silicon nitride layer 18 is relatively permanent; that is, it takes a long time (e.g., in the manner of months or even years) for it to be completely dissipated. Thus, the device 10 is said to be nonvolatile; that is, once the threshold voltage is changed to one value by causing the charge to appear at the silicon oxide-silicon nitride interface, it will be permanent unless changed by another Vg voltage pulse.

One theory suggests that the charge which builds up at the silicon oxide 16-silicon nitride 18 interface will be greater in the portion of the interface which overlaps the source 15 and drain 14 regions; this is shown by the extra "+" notations in FIG. 1. This, in turn, causes the electrons in the substrate 12 to be pulled towards regions 26 and 27, which are near the junctions of the channel 24 and the drain 14, and the channel 24 and the source 15. When this occurs, the resistivity in the areas 26 and 27 becomes lower, and the voltage at which the diode, formed by the drain 14 and the substrate 12 or the source 15 and the substrate 12 at the regions 26 or 27, will breakdown correspondingly becomes lower. Normally, this is no problem at the region 27, because the source 15 is at ground potential. However, the drain 14 is normally biased above this breakdown voltage.

Another theory suggests that the charge remains relatively constant along the entire interface, and the resistivity of the entire channel region 24 becomes lower. In either event, the drain 14-substrate 12 diode has a low zener breakdown voltage associated therewith.

Figure 2:
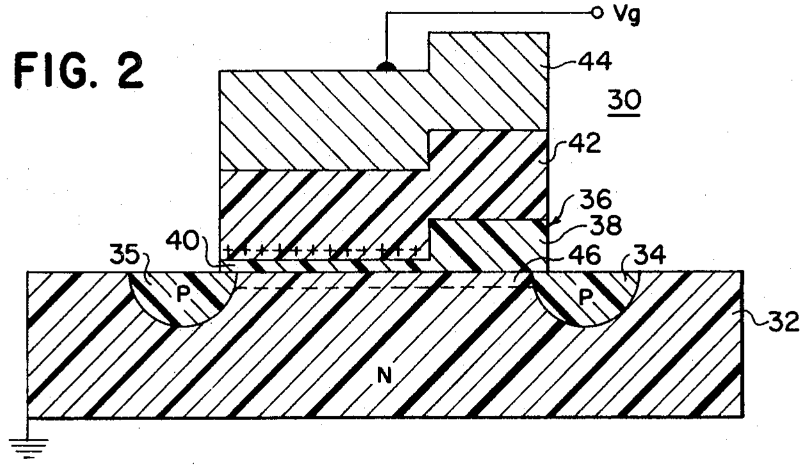
FIG. 2 shows one embodiment of the improved MNOS device of this invention.
Figure 3:
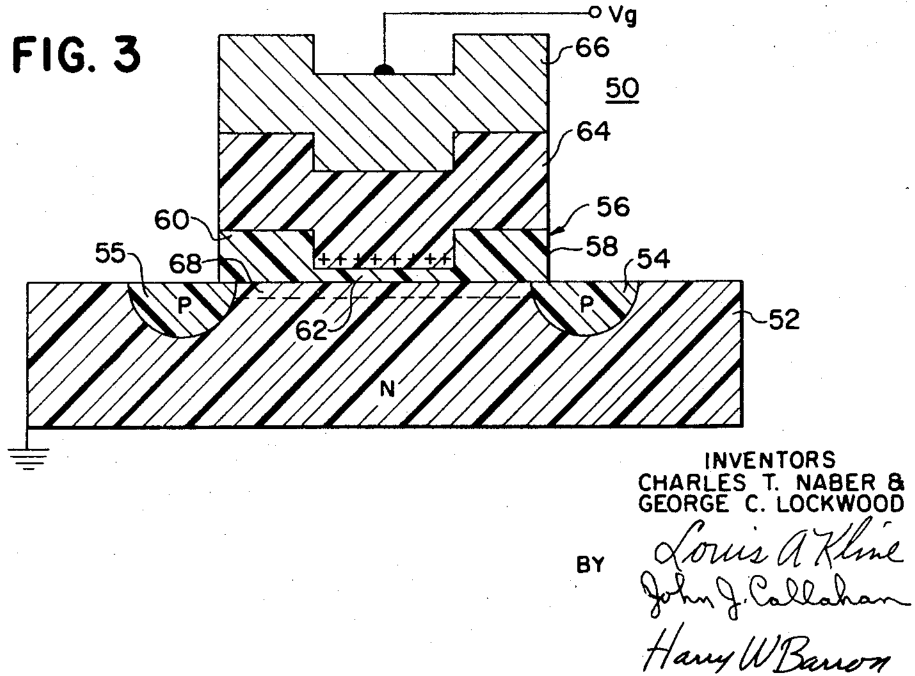
FIG. 3 shows a second embodiment of the improved MNOS device of this invention.

The problem of zener breakdown between the drain 14-substrate 12 is solved by the devices shown in FIGS. 2 and 3. Referring specifically to FIG. 2, an improved MNOS device 30 is shown, which has a substrate 32, a drain 34, and a source 35, which are similar to the substrate 12, the drain 14, and the source 15 regions in FIG. 1. In the device 30, a dual-thickness silicon oxide layer 36 is provided. The first portion 38 is much thicker than the corresponding silicon oxide layer 16 in FIG. 1. For instance, it may be in the order of from 200 to 1,000 Angstroms in thickness, with 400 Angstroms being a typical example. The second portion 40 is similar in thickness to the silicon oxide layer 16 in FIG. 1. There is also provided a silicon nitride layer 42 and a conductor layer 44, which are similar to the layers 18 and 20 in FIG. 1.

The portion 38 of the silicon oxide layer 36 should be thick enough so that negligible charge builds up at the interface of the silicon nitride 42 and silicon oxide 36 layers when voltage pulse Vg is applied to the conductor layer 44; that is, thick enough to prevent electric charge from flowing therethrough as a result of the applied Vg voltage. The thinner portion 40 of the silicon oxide layer 36 is made the same thickness as the silicon oxide layer 16 in FIG. 1, so that charge will build up at the silicon oxide 36 and silicon nitride 42 interface when voltage pulse Vp is applied to the conductor layer 44, and cause the threshold voltage of the device to vary. In this manner, only the portion 40 of the silicon oxide layer 36 acts as the memory portion of the device. Because no charge exists at the interface of the portion 38 of the silicon oxide layer 36 and the silicon nitride layer 42, electrons will not be attracted to the area adjacent to the junction of the drain 34 and the channel 46. Thus, the problem of low voltage zener breakdown at this junction is eliminated. The length of the portions 38 and 40 with respect to one another is not critical, except that the junction of the drain 34 and the substrate 32 must be rendered immune to any silicon oxide layer 36 and silicon nitride layer 38 interface charge. One example of these lengths is to make the portion 38 one third of the channel length and the portion 40 two thirds of the channel length.

Another advantage that the device 30 has over the prior-art devices, such as the device 10, is that the thickness of the portion 38 of the silicon oxide layer 36 can be varied to limit the maximum positive value which the threshold voltage of the device 30 can assume. By making the thickness of the portion 38 of the silicon oxide layer 36 greater, it will be necessary to apply a more negative voltage to the conductive layer 44, in order to create the channel 46 beneath the portion 38. The channel created beneath the portion 38 will be independent of any stored charge at the interface of the silicon oxide layer 36 and the silicon nitride layer 40. Thus, it can be created only upon application of a negative voltage to the conductive layer 44. However, in the case of the portion 40, the charge at the interface of the silicon oxide layer 36 and the silicon nitride layer 42 will affect the threshold voltage at which the channel 46 is created. Thus, the portion of the device 30 which includes the portion 40 of the silicon oxide layer 36 acts as a normal memory-type MNOS device, and the portion of the device 30 which includes the portion 38 of the silicon oxide layer 36 acts as a nonmemory-type MNOS device. As a result of the dual thickness of the silicon oxide layer 36, the device 30 is a memory-type device with an upper negative value limit on the threshold voltage required to render it conductive.

Referring now to FIG. 3, the MNOS device 50 represents a second embodiment of the improved MNOS device of this invention. In the device 50, the substrate 52 and the drain region 54 and the source region 55 are shown and are similar to the corresponding regions in FIGS. 1 and 2. However, in the device 50, the silicon oxide layer 56 includes thick portions 58 and 60 in the areas above the junction of the channel 68 to both source and drain regions 55 and 54, and a thin portion 62 therebetween. The silicon nitride layer 64 and the conductive layer 66 again are similar to the corresponding layers in FIGS. 1 and 2; that is, they are of a constant thickness. In the device 50, the memory action occurs in the portion 62 of the silicon oxide layer 56, and the portions 58 and 60 serve to limit the value of the threshold voltage as well as to impede the zener breakdown between the drain 54 and substrate 52 diode. In the case of the device 50, the source and drain regions can be interchanged in circuit without any problems. Further, the source region 55 can be biased above the breakdown voltage, if desired, in a particular circuit application.

In order to construct the improved devices which are shown in FIGS. 2 and 3, conventional techniques may be used. After providing the N type semiconductor substrate and diffusing the P source and drain regions, a thick silicon oxide layer is grown on the device. Thereafter, the portion of the silicon oxide layer which is desired to be thin is etched away to the substrate surface, and thereafter a thin layer is grown on top of the etched and nonetched areas. In this manner, there are the desired thick and thin portions of the silicon oxide layer. Thereafter, a silicon nitride layer and a conductor layer, such as aluminum, are placed thereon by conventional techniques.

Figure 4:
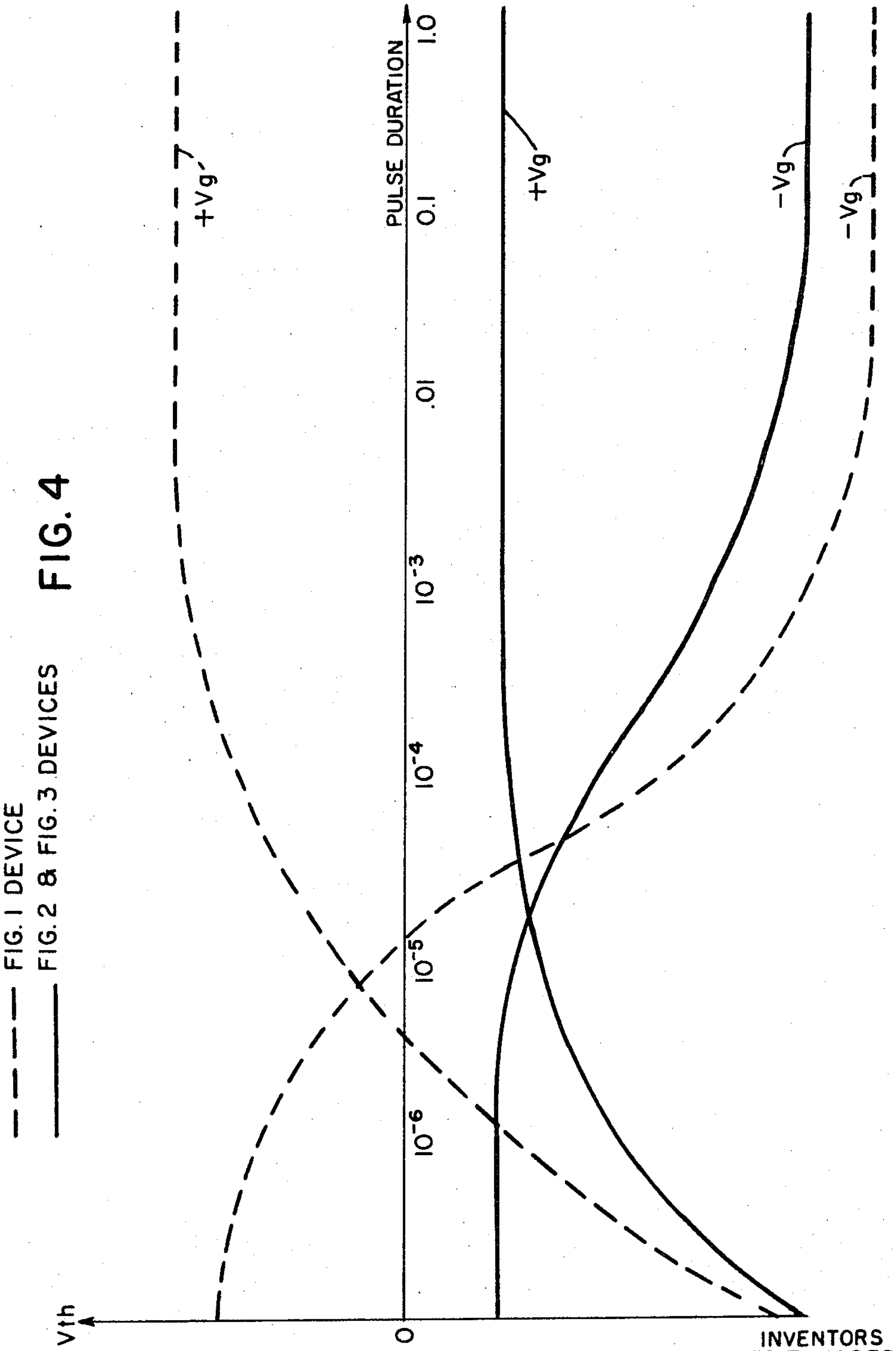
FIG. 4 shows writing characteristic curves which illustrate how the threshold voltage of the improved MNOS device can be limited to strictly negative values.

Referring now to FIG. 4, there is shown a series of writing characteristic curves which better illustrate how the thickness of the thicker portion of the oxide layer can be used to control the maximum value of the threshold voltage. In FIG. 4, the dashed lines represent the device shown in FIG. 1, and it is seen that, by applying a certain voltage pulse Vg of a certain duration, one can vary the threshold voltage between a certain positive and a certain negative value. As previously explained, this has certain undesirable effects on the device. The solid line shown in FIG. 4 represents the threshold voltage versus pulse duration characteristics for the same pulse of the improved devices shown in FIGS. 2 and 3. In this case, it is seen that, due to the thickness of the thicker portion of the silicon oxide layers in FIGS. 2 and 3, the maximum value of the threshold voltage is limited to a certain negative voltage. This is due to the fact that there is no memory associated with the thicker portion of the silicon oxide layer. Thus, it is necessary that a certain negative voltage be applied to the aluminum layer in order to create the channel beneath the thicker region. However, since the thinner portion of the silicon nitride-silicon oxide interface does exhibit the memory characteristics, the threshold voltage at which the channel can be created under this portion of the device is still variable. With the improved device, therefore, it is seen that the threshold voltage can be made to vary between a slightly negative voltage and a greater negative voltage. The read voltage applied to the device may be between these two values. Thus only one power supply is necessary, and it is not necessary to limit the values by design techniques other than in a general nature.

It is also possible to place a limit on the more negative value that the threshold voltage can assume by providing a dual-thickness silicon oxide layer which has the thicker portion run over the entire channel length, but not over its entire width. In this case, the thick and thin portions would be parallel to each other between the source and drain regions. Here, wherever a certain read voltage was applied to the conductor layer, the substrate under the thick oxide portion of the gate region would invert and the channel would be formed regardless of the charge at the interface of the thin portion of the silicon oxide layer and the silicon nitride layer.

It has been assumed herein that the devices shown are P channel devices. However, an N channel device could be used to perform the same functions using the same improvements herein, with the exception that all voltages referred to would be reversed in polarity. Further, it should be noted that, although an MNOS device is described, any type of device in which an interface can be created between two insulator materials where one has a high charge trapping capability, such as the silicon nitride layer, and one has a low charge trapping capability, such as the silicon oxide layer, could be used. Further, any type of semiconductor material may be used in place of silicon.

What is claimed is:

1. A memory type insulated gate field-effect semiconductor device comprising:

a semiconductor substrate having a first opposite conductivity region in the surface thereof and a second opposite conductivity region, in the surface thereof, with an intermediate region therebetween;

a first layer of an insulating material having a relatively low concentration of charge traps affixed to said intermediate region;

a second layer of an insulating material having a relatively high concentration of charge traps affixed to said first layer; and a third layer of a conductive material affixed to said second layer;

said first layer positioned directly above said intermediate region and having a thick portion and a thin portion, said thin portion having less than a charge tunnel thickness whereby a charge can tunnel therethrough and said thick portion having more than a charge tunnel thickness whereby a charge cannot tunnel therethrough.

2. The invention according to claim 1 wherein said device has an alterable threshold voltage associated therewith which can be varied within certain limits by nonvolatilely storing varying amounts of charge in the second layer of insulating material, and wherein the thickness of said thick portion of said first layer determines one of said limits.

3. The invention according to claim 2 wherein said device has a first opposite conductivity source region and a second opposite conductivity drain region, and wherein said thick portion of said first layer is in the vicinity of said drain region of said device.

4. A memory-type filed-effect semiconductor device comprising:

a semiconductor substrate including a source region, a drain region and an intermediate region in the surface of the semiconductor substrate, said intermediate region capable of having a channel formed therein through which majority carriers can flow, said channel having a first end adjacent said source region into which said majority carriers are introduced and a second end adjacent said drain region from which said majority carriers are derived;

a first insulator layer of a material having a relatively low concentration of charge traps affixed to said intermediate region;

a second insulator layer of a material having a relatively high concentration of charge traps affixed to said first layer; and a conductor layer positioned above said channel and spaced therefrom by said first and second insulator layers, said first insulator layer being thicker in the vicinity of said second end of said channel than in the vicinity of another portion of said channel, said thin portion having less than a charge tunnel thickness whereby charges can tunnel therethrough and said thick portion having more than a charge tunnel thickness whereby charges cannot tunnel therethrough.

5. The invention according to claim 4 wherein the thickness of said first insulator layer in the vicinity of said another portion of said channel is chosen to allow any charge existing at the interface of said first and second insulator layers to flow through said first insulator layer to said channel and the thickness of said first insulator layer in the vicinity of said second end of said channel is chosen to substantially prevent any charge existing at the interface of said first and second insulator layers from flowing through said first insulator layer to said channel.

6. The invention according to claim 5 wherein said device has a certain threshold voltage associated therewith which can be varied within certain limits; and wherein said first insulator layer thickness in the vicinity of said second end can be selected to determine one of said certain limits.

7. The invention according to claim 5 wherein said substrate includes a semiconductor material of one conductivity and a pair of regions of opposite conductivity respectively positioned at said first and second ends of said channel region, said region between said pair of opposite conductivity regions becoming said channel when the conductivity thereof is said opposite conductivity.

8. The invention according to claim 5 wherein said substrate is silicon, said first insulator layer is silicon oxide, said second insulator layer is silicon nitride, and said conductor layer is aluminum.

9. The invention according to claim 4 wherein said first insulator layer is thicker in the vicinity of said first end and said another portion of said first insulator layer is between said thicker portions.

10. A metal-nitride-oxide-semiconductor device comprising:

a semiconductor material substrate of one conductivity having first and second regions of opposite conductivity extending therein, said first and second regions being separated by an intermediate region having a channel formed therein through which majority carriers flow from said first region to said second region, said first, second, and intermediate regions all extending from one surface of said substrate;

a layer of oxide material affixed to said one surface of said substrate to interface with the junction of said first region-channel region, said channel region, and the junction of said channel region-second region, said oxide layer having a first thickness in the vicinity of said first region-channel region junction and a greater second thickness in the vicinity of said channel region-second region junction;

a layer of nitride material affixed to said oxide material and spaced apart from said substrate by said oxide material; and a layer of conductor material affixed to said nitride material and spaced apart from said oxide material by said nitride material;

said first thickness of said oxide layer being of less than a charge tunnel thickness to allow charges to tunnel between the oxide material-nitride material interface and said substrate-oxide material interface and said substrate-oxide material interface and said second thickness of said oxide material being of more than a charge tunnel thickness to prevent charges from tunneling between said oxide material-nitride material interface and said substrate-oxide material interface.

11. The invention according to claim 10 wherein said semiconductor material is silicon, said oxide material is silicon oxide, said nitride material is silicon nitride, and said conductor material is aluminum.

12. The invention according to claim 11 wherein the first thickness of said silicon oxide material is between 15 Angstroms and 60 Angstroms, the second thickness of said silicon oxide material is between 200 Angstroms and 1,000 Angstroms, and the thickness of said silicon nitride material is between 400 Angstroms and 1,000 angstrom.

13. The invention according to claim 11 wherein the first thickness of said silicon oxide material is approximately 30 Angstroms, the second thickness of said silicon oxide material is approximately 400 Angstroms, and the thickness of said silicon nitride material is approximately 750 Angstroms.

14. A metal-nitride-oxide-semiconductor device comprising:

a semiconductor material substrate of one conductivity having a first and a second region of opposite conductivity extending therein, said first and second regions being separated by a channel region having a channel formed therein through which majority carriers can flow from said first region to said second region, said first, second, and channel regions all extending from one surface of said substrate;

a layer of oxide material affixed to said one surface of said substrate to interface with the junction of said first region-channel region, said channel region, and the junction of said channel region-second region, said oxide layer having a first thickness in the vicinity of said first region-channel region junction and in the vicinity of said channel region-second region junction and a second thickness therebetween;

a layer of nitride material affixed to said oxide material and spaced apart from said substrate by said oxide material; and a layer of conductor material affixed to said nitride material and spaced apart from said oxide material by said nitride material;

said first thickness being of more than a charge tunnel thickness to prevent any charge from tunneling between said oxide material-nitride material interface and said substrate-oxide material interface and said second thickness being of less than a charge tunnel thickness to allow charge to tunnel between said oxide material-nitride material interface and said substrate-oxide material interface.

15. The invention according to claim 14 wherein said semiconductor material is silicon, said oxide material is silicon oxide, said nitride material is silicon nitride, and said conductor material is aluminum.

16. The invention according to claim 15 wherein the first thickness of said silicon oxide material is between 200 and 1,000 Angstroms, the second thickness of said silicon oxide material is between 15 Angstroms and 60 Angstroms, and the thickness of said silicon nitride material is between 400 Angstroms and 1,000 Angstroms.

17. The invention according to claim 15 wherein the first thickness of said silicon oxide material is approximately 400 Angstroms, the second thickness of said silicon oxide material is approximately 30 Angstroms, and the thickness of said silicon nitride material is approximately 750 Angstroms.

* * * * *